United States Patent Office 3,482,955
Patented Dec. 9, 1969

3,482,955
GLASS DECOLORIZING WITH MANGANESE ENRICHED ALKALI BORATE GLASS
Joseph R. Monks, Toledo, Ohio, assignor to Owens-Illinois, Inc., a corporation of Ohio
No Drawing. Filed Sept. 16, 1966, Ser. No. 579,815
Int. Cl. C03b 5/16
U.S. Cl. 65—134                                          4 Claims

ABSTRACT OF THE DISCLOSURE

A method of decolorization of the ferrous oxide content of a soda-lime glass containing up to about 0.1 percent by weight of ferrous oxide and which includes the steps of preparing and homogeneously admixing a manganese-enriched, alkali-borate glass throughout the soda-lime glass while the latter in flowing through the forehearth section of a glass melting furnace; the manganese-enriched, alkali-borate glass being admixed in a ratio of about 4–100 pounds of decolorizing glass per ton of soda-lime glass and being composed of essentially the following constituents in the indicated range of percent by weight:

| Constituent: | Percent by weight |
|---|---|
| $B_2O_3$ | 35–70 |
| $Na_2O+K_2O$ ($K_2O/Na_2O$ being less than 25%) | 10–40 |
| Mn (calculated as MnO) | 1–23 |

---

The present invention relates to a method of continuously producing decolorized homogeneous glass, and more particularly to such a method utilizing manganese enriched frit glasses as the decolorizing agent.

In the manufacture of colorless glass, particularly soda-lime-silica flint glasses, the presence of iron as an impurity in the raw materials has been a serious problem in that the presence of ferrous iron ($Fe^{+2}$) tends to cause a bluish or blue-green discoloration in the finished glass in addition to decreasing the overall brightness. Unfortunately, the economics of glass manufacture will not permit the use of raw materials free from these iron impurities since most of the significant deposits of sand and limestone contain at least trace amounts of the various iron salts and oxides.

When these raw materials are melted in the glass batch at temperatures of 2600–2900° F., significant amounts of the iron present is converted to the ferrous ($Fe^{+2}$) state under the influence of the prevailing equilibrium conditions. Various decolorizers and oxidizing agents have been added to the glass batch in an attempt to oxidize the ferrous iron to ferric iron and thus minimize this glass coloration, since the ferric iron ($Fe^{+3}$) is a much weaker colorant. This practice has been quite inefficient on a batch basis since the dissociation, as is indicated below, $$Fe_2O_3 \longrightarrow 2FeO + \tfrac{1}{2}O_2$$

is more prevalent at the higher temperatures.

Additionally, the decolorizers and oxidizing agents employed often tend to discolor the glass or decrease the brightness as a result of the reactions that occur between these decolorizing agents and the various constituents in the glass. For instance, the reduced form of the oxidizing agent employed often has a distinct color of its own.

In view of the foregoing, it is therefore an object of the present invention to provide a novel method of decolorizing soda-lime glasses.

Another object is to provide a novel method of oxidizing ferrous iron to ferric iron at temperatures below the batch melting temperatures.

A further object of the present invention is to provide a novel method of oxidizing ferrous iron to ferric iron in soda-lime glasses that can be readily incorporated into conventional glass making equipment.

Still a further object of the present invention is to provide a method of decolorizing soda-lime glass containing iron as the impurity utilizing a decolorizing frit glass that produces no undesirable coloration of its own.

Yet another object of the present invention is to provide a method of decolorizing soda-lime glass by admixing a decolorizing frit glass with a molten base glass as the molten glass is being transferred from the melting furnace to the point of forming.

In attaining the objects of the present invention, one feature resides in admixing an oxidized manganese enriched frit glass under proper conditions of agitation, in a forehearth of a commercial glass melting furnace with a soda-lime base glass containing iron as an impurity to produce a brighter glass of improved optical characteristics.

The above and other objects, features and advantages of the present invention will become apparent to those skilled in the art from the following description and claims.

Manganese as a decolorizer for soda-lime glass containing iron is old in the art. Heretofore, manganese has been added directly to the melting furnace to achieve the desired oxidation of the ferrous to ferric iron. One of the products of this oxidation-reduction reaction is usually $Mn_2O_3$. Since manganese as the $Mn^{+3}$ ion exhibits an intense purple coloration the entire batch of glass is often colored a violent purple with the slightest inbalance of the iron to manganese ratio at the prevailing batch temperature. In addition, the prevalent batch temperature tends to favor the formation of the lower valence states of both iron and manganese in their respective oxides since there is a tendency for the oxygen to disassociate at these temperatures. For these and other reasons, manganese is not widely used as a glass batch decolorizer today.

My invention now provides a method for oxidizing ferrous iron to ferric iron in soda-lime glass at lower temperatures and under controlled conditions of agitation to achieve clear, bright, flint glasses of low purity, having a dominant wavelength of commercial acceptability.

Dominant wavelength, purity and brightness, as used above, specify the color characteristics of glass in terms of the C.I.E. designation system. The C.I.E. colorimetric values are based upon the I.C.I. Chromaticity Diagram. C.I.E. refers to the First International Commission of Illumination and the diagram from which the values are taken defines color in terms of mixtures of theoretical colored lights. The C.I.E. system makes possible the exact specification of colors by means of a "color map." The C.I.E. system of color notation specifies the color of glasses in terms of brightness, purity and dominant wave length. "Brightness," which is usually expressed in terms of percentage, is the amount of visual response of a normal observer to the radiation emergent from a transparent object relative to the response of the observer to the radiation incident upon the object. Thus, brightness may be briefly termed the lightness of color of an object. "Purity," which is also normally expressed in terms of percentage, is a measure of the monochromaticness of a color with monochromatic light having purity of 100%. By diluting the monochromatic radiation with white light made up of all wavelengths, the color is thereby diluted and the purity reduced. "Dominant Wavelength," usually expressed in millimicrons (m$\mu$), is the wave length of monochromatic light appearing to the eye to have the same hue as the mixed light actually encountered.

With respect to the soda-lime-flint glasses where there is very little color, the dominant wave length can be said to describe the color tint seen by the eye. Purity can be said to be a measure of the amount of color present, while brightness is the total amount of light transmitted which is perceptable to the human eye.

For clear, bright, flint glasses, the following color characteristics for 1½ inch sample thickness are usually desirable:

Dominant wavelength _____ 550–580 Millimicrons.
Purity _____ Less than 5%.
Brightness _____ Greater than 70%.

When iron is present in the ferrous state, the glass has a definite blue-green cast accompanied by low brightness when masking agents are added. In the ferric state, the glass has a very faint yellow cast. From the following examples, it will be seen that the present invention decreases the amount of ferrous iron in such a manner that higher brightness can be achieved.

In carrying out the present invention, any frit glass containing manganese can be used. I have found that manganese enriched glass compositions in the alkali borate system are particularly suitable for addition as frits for decolorizing a molten soda-lime base glass at the forehearth.

The alkali borate frits containing manganese are usually within the following range in practicing the present invention.

|  | Broad range, percent |
|---|---|
| $B_2O_3$ | 35–70 |
| $R_2O$ | 10–40 |
| Total Mn as MnO | 1–23 |

$R_2O$ as used above represents a mixture of $Na_2O$ and $K_2O$, with the latter being present in an amount less than 25% by weight of the former. Preferably, the only alkali present is $Na_2O$. Such frits can be easily prepared from batches containing only borax and manganese dioxide.

Preferably, these manganese enriched frits are within the composition range:

|  | Percent |
|---|---|
| $B_2O_3$ | 40–65 |
| $Na_2O$ | 15–30 |
| Total Mn as MnO | 5–23 |

Frits in the above systems are low melting (i.e., less than 1700° F.), and can be readily assimilated in ordinary soda-lime base glasses at forehearth temperatures (i.e. 2300–2600° F.). The amount of frit required will, of course, depend upon the amount of iron present in the base glass, and the concentration of manganese in the frit. For most applications, employing frits in the above compositional range, in conjunction with soda-lime glasses prepared from ordinary batch materials, the amount of frit required is about 0.2 to 5% by weight of the base glass to be decolorized.

Soda-lime base glasses to be decolorized are well known, and usually have compositions within the range:

|  | Percent |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |
| Total iron as $Fe_2O_3$ (impurity) | 0.0–0.1 |

The conditions and procedures for making the above base glass is conventional, and such conditions are well known to those skilled in the art as exemplified in Table IX B–11 on page 245 of the "Handbook of Glass Manufacture" by Tooley, Ogden Publishing Co., New York, N.Y., 1953.

In the production of glass containers, a base glass is prepared in a melting tank of several hundred tons capacity. The batch constituents are added and proceed through the tank under melting and refining conditions. The glass is issued out of the fining end of the melting tank by being run through one or a plurality of forehearths which are provided in connection with the tank to feed the forming machines. For description of a typical forehearth embodiment, attention is called to Hagedorn Patent 3,024,121 dated Mar. 6, 1962.

The following will demonstrate in specific detail how manganese enriched frit glass can be utilized to decolorize soda-lime base glass by admixing the frit with the base glass in the forehearth of the glass melting furnace.

Example I

A manganese enriched frit is prepared from the following batch ingredients:

| Batch ingredient: | Parts by weight |
|---|---|
| Dehydrated borax (30.5% $Na_2O$, 68.5% $B_2O_3$) | 136.3 |
| Manganese dioxide ($MnO_2$) | 15 |

The batch materials are melted in an electric furnace wtih mechanical agitation at 1600° F., for 2 hours under ambient air atmosphere.

The molten glass is suitably converted to a powdered frit by feeding it as a stream from the outlet of the melting furnace and chilling rapidly, then further granulated by suitable mechanical means. Powdered frit glass particles in the range of −8 to +80 mesh size are satisfactory for the purposes of this invention.

The resulting frit is purple-black in color and has the following anaysis:

| Oxide: | Percent by weight |
|---|---|
| $Na_2O$ | 27.95 |
| $B_2O_3$ | 62.01 |
| MnO | 8.24 |
| $Mn_2O_3$ | 3.80 |

The $MnO/Mn_2O_3$ ratio is beieved to be the equilibrium ratio under the existing melting conditions for the particular frit compositions. The level of $Mn_2O_3$ can be increased by bubbling oxygen through the batch during the melting process.

Examples II–IV

The data in the following Table I demonstrates the effectiveness of the frit of Example I in decolorizing an ordinary soda-lime glass containing iron as the impurity.

TABLE I.—COMPOSITION AND PROPERTIES DECOLORIZED SODA-LIME GLASSES

| Constituent | Control, percent | Ex. II, percent | Ex. III, percent | Ex. IV, percent |
|---|---|---|---|---|
| $SiO_2$ | 73.03 | 72.73 | 72.45 | 72.15 |
| $Al_2O_3$ | 1.71 | 1.70 | 1.70 | 1.69 |
| CaO | 10.65 | 10.61 | 10.56 | 10.52 |
| MgO | 0.90 | 0.90 | 0.89 | 0.89 |
| $Na_2O$ | 13.43 | 13.49 | 13.54 | 13.60 |
| $K_2O$ | 0.21 | 0.21 | 0.27 | 0.21 |
| $B_2O_3$ |  | 0.28 | 0.56 | 0.73 |
| Se | 0.001 | 0.001 | 0.001 | 0.001 |
| MnO |  | 0.032 | 0.064 | 0.097 |
| $Mn_2O_3$ |  | 0.015 | 0.030 | 0.045 |
| Total iron as $Fe_2O_3$ | 0.041 | 0.041 | 0.041 | 0.041 |
| FeO | 0.0157 | 0.013 | 0.0091 | 0.0070 |
| Lb. of frit per ton of base glass | 0 | 8 | 16 | 24 |
| C.I.E. data for 1.5 inch thickness: |  |  |  |  |
| Percent brightness | 69.83 | 69.03 | 74.54 | 75.42 |
| Percent purity | 3.68 | 3.98 | 2.29 | 3.08 |
| Dominant wavelength (m$\mu$) | 565.3 | 566.7 | 553 | 558.8 |

The frit of Example I is added at forehearth temperatures to the soda-lime glass designated "control" (Table I) in the amounts indicated in Examples II through IV in Table I. This addition is accomplished after the base glass issues from the melting tank into the forehearth at temperatures in the range of 2300–2600° F. Feeding, stirring and mixing means known in the art are used to produce homogeneous admixture of the frit into the base glass to produce a composite glass of increased brightness and improved optical characteristics. Suitable apparatus and methods for admixing the frit in the forehearth are disclosed in U.S. Patent 3,057,175 to R. R. Rough, it issued on Oct. 9, 1962 and the Hagedorn patent mentioned above.

In another form, the frit may be added in the molten state. It is therefore contemplated herein that the term frit, can include either form of the glassy material.

Examples II through IV (Table I) indicated the brightness of the soda-lime glass is increased according to the amount of the manganese frit added. The amount of the ferrous iron is also decreased by this frit addition without causing the undersirable violet coloration usually associated with the decolorization of glass batches with manganese as evidenced by the dominant wavelength of the composite glass.

I claim:

1. A method of decolorizing the ferrous oxide content of a molten mass of soda-lime glass containing up to about 0.1 percent by weight of color-producing ferrous oxide while said molten mass of soda-lime glass is flowing through the forehearth section of a glass melting furnace, said method comprising the steps of:

providing a glass batch composition having a melting temperature below 1700° F. and calculated to yield a manganese-enriched, alkali-borate, decolorizing glass consisting essentially of the following constituents in the indicated range of percent by weight:

| Constituent: | Percent by weight |
|---|---|
| $B_2O_3$ | 35–70 |
| $Na_2O+K_2O$ ($K_2O/Na_2O$ being less than 25%) | 10–40 |
| Mn (calculated as MnO) | 1–23 | melting said glass batch composition to a molten mass in the presence of an oxidizing atomsphere and homogeneously admixing same into a homogenous molten mass of oxidized alkali-borate decolorizing glass in which essentially all of the manganese is present in a divalent and trivalent state;

flowing a molten mass of said soda-lime glass through the forehearth section of a glass melting furnace;

bringing the temperature of said soda-lime glass to a temperature within the temperature range of about 2300° F.–2600° F. while within said forehearth section;

flowing a stream of said decolorizing glass into said flowing mass of soda-lime glass in said forehearth section and concurrently admixing same homogeneously throughout said soda-lime glass at a rate of between about 4–100 pounds of said decolorizing glass per ton of said soda-lime glass;

and issuing the resulting glass admixture from said forehearth as a composite glass essentially devoid of ferrous oxide coloration.

2. The method as defined in claim 1, wherein said glass batch composition is calculated to yield a decolorizing glass consisting essentially of the following constituents in the indicated range of percent by weight:

| Constituent: | Percent by weight |
|---|---|
| $B_2O_3$ | 40–65 |
| $Na_2O$ | 15–30 |
| Mn (calculated as MnO) | 5–23 |

3. The method as defined in claim 1, wherein said batch composition is calculated to yield a decolorizing glass consisting essentially of:

| Constituent: | Percent by weight |
|---|---|
| $B_2O_3$ | 62.0 |
| $Na_2O$ | 27.9 |
| $MnO+Mn_2O_3$ | 12.0 |

4. A method as defined in claim 1, wherein said soda-lime glass is of the composition:

| | Percent |
|---|---|
| $SiO_2$ | 60–75 |
| $Al_2O_3$ | 0.3–10 |
| CaO+MgO | 6–15 |
| $Na_2O$ | 12–18 |
| $K_2O$ | 0–5 |
| BaO | 0–5 |
| Total iron as $Fe_2O_3$ (impurity) | 0.0–0.1 |

References Cited

UNITED STATES PATENTS

| 1,726,635 | 9/1929 | Taylor | 106—52 |
| 2,113,195 | 4/1938 | Flint | 106—52 |
| 2,582,453 | 1/1952 | Pincus | 106—52 |
| 2,955,948 | 10/1960 | Silverman | 106—52 |
| 3,351,475 | 11/1967 | Hagedurn | 106—52 |

FOREIGN PATENTS 1,880   1/1899   Great Britain.

FRANK W. MIGA, Primary Examiner

U.S. Cl. X.R.

65—121; 106—47, 52